Feb. 16, 1965 B. A. PROCTOR 3,169,720

RECORDING MEDIUM DRIVE

Filed July 27, 1959 5 Sheets-Sheet 1

INVENTOR.
BARTON A. PROCTOR

BY

Nolte and Nolte
ATTORNEYS

Feb. 16, 1965 B. A. PROCTOR 3,169,720

RECORDING MEDIUM DRIVE

Filed July 27, 1959 5 Sheets-Sheet 2

INVENTOR.
BARTON A. PROCTOR

BY

Nolte and Nolte
ATTORNEYS

INVENTOR.
BARTON A. PROCTOR

BY *Nolte and Nolte*
ATTORNEYS

Feb. 16, 1965 B. A. PROCTOR 3,169,720

RECORDING MEDIUM DRIVE

Filed July 27, 1959 5 Sheets-Sheet 4

INVENTOR.
BARTON A. PROCTOR

BY

Nolte and Nolte
ATTORNEYS

INVENTOR.
BARTON A. PROCTOR
BY
Nolte and Nolte
ATTORNEYS

United States Patent Office 3,169,720
Patented Feb. 16, 1965

3,169,720

RECORDING MEDIUM DRIVE

Barton A. Proctor, 42 Hillside Road, Larchmont, N.Y., assignor of thirty-three and one-third percent to Albert C. Nolte, New York, N.Y.

Filed July 27, 1959, Ser. No. 829,933
12 Claims. (Cl. 242—55.12)

This invention relates in general to recording and reproducing machines and in particular to a new and useful machine of this character having means for selectively recording one or more sound tracks on a tape and having improved driving mechanism for transporting the tape into association with the recording head and between a pair of reels.

The present invention is an improvement over previous constructions of tape recording machines particularly in connection with the provision of a rotating magnetic head turret which permits the positioning of one or more magnetic recording heads in operative association with the recording tape for recording or reproducing one or more sound tracks on the tape as it is transported into association with a selected effective magnetic recording and reproducing head system. The invention includes means for transporting the tape past the magnetic head turret in either direction by a novel arrangement of tape driving mechanism. The driving mechanism includes means for shifting a driving capstan between positions in driving association with the tape recording medium at a location adjacent the reel upon which it is to be wound. The drive includes means for frictionally retarding the reel which is being unwound whenever the driving capstan is positioned to wind a tape on the opposite reel. The driving mechanism further includes means for easily changing the rotative speed of the driving capstan.

Accordingly it is an object of this invention to provide an improved tape recording and reproducing machine.

A further object of this invention is to provide a tape recorder and reproducer having a single capstan drive which may be movable into engagement with recording tape for transporting the tape onto one of two reels and including a simple driving mechanism for the capstan permitting forward and reverse rotation at multiple speed.

A further object of the invention is to provide a machine of the character described having a rotating magnetic head recording and reproducing turret which may be selectively positioned to permit recording or reproducing on one or more lines of a tape as the tape is transported past a pre-selected recording and reproducing head.

A further object of this invention is to provide a tape recording and reproducing unit including a novel capstan multi-speed drive which may be positioned in one of two locations to drive the tape onto one of two reels and including a rotatable turret between the reels having recording heads for single or multiple line recording on the tape as the tape is transported past a pre-selected head which has been rotated into the path thereof.

A further object of the invention is to provide a tape recording and reproducing unit which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
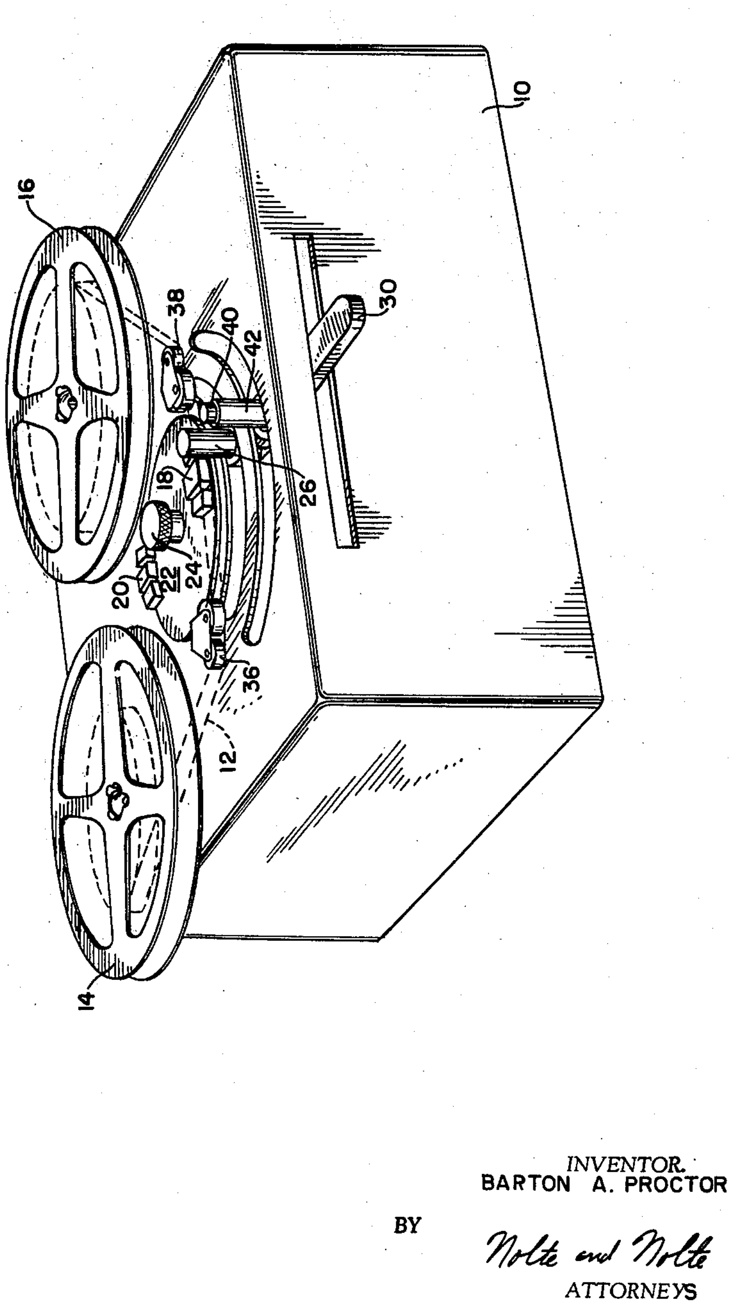
FIG. 1 is a perspective view of a tape recording and reproducing unit constructed in accordance with the invention.
Figure 2:
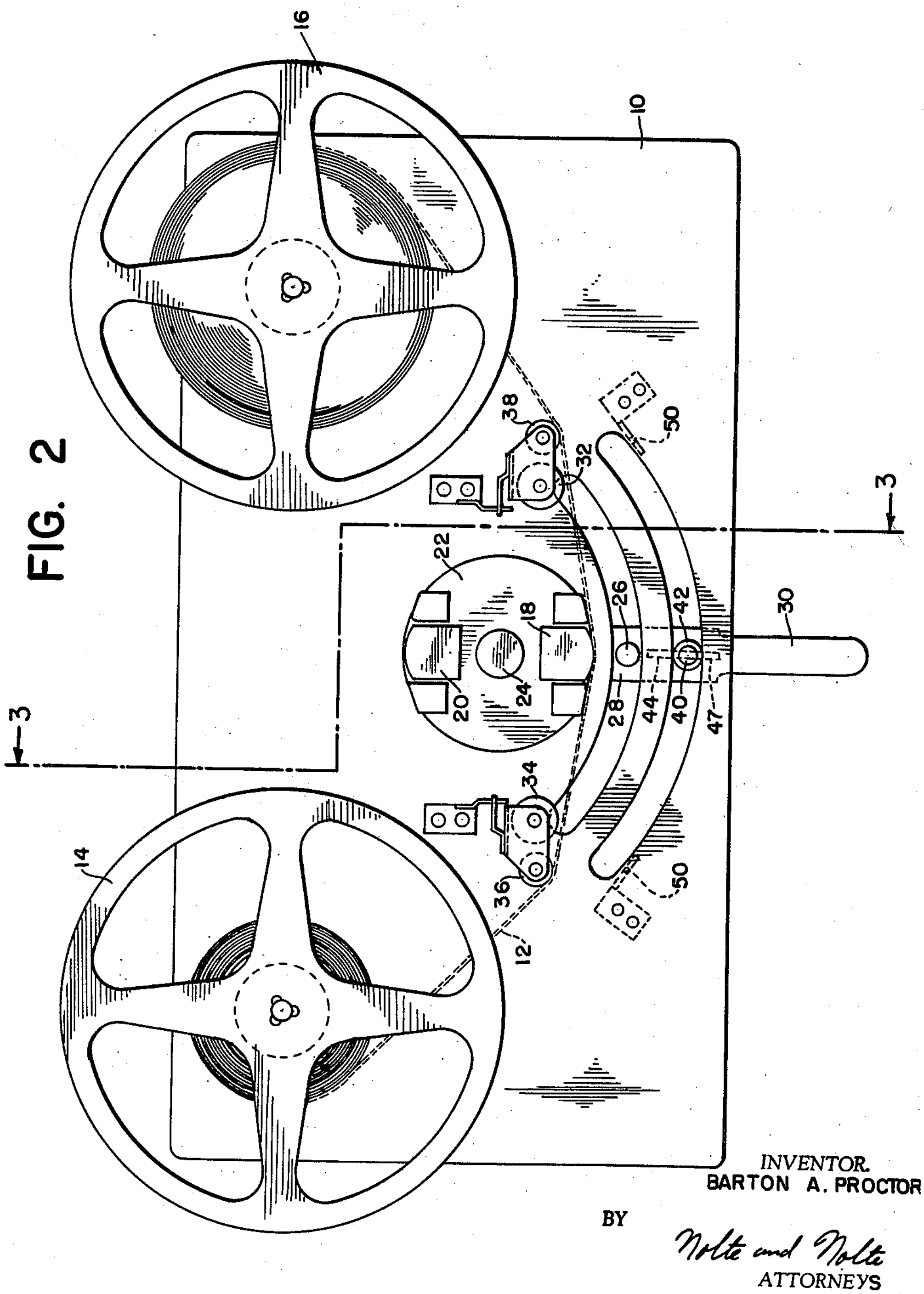
FIG. 2 is a fragmentary top plan of the recording unit indicated in FIG. 1.
Figure 3:
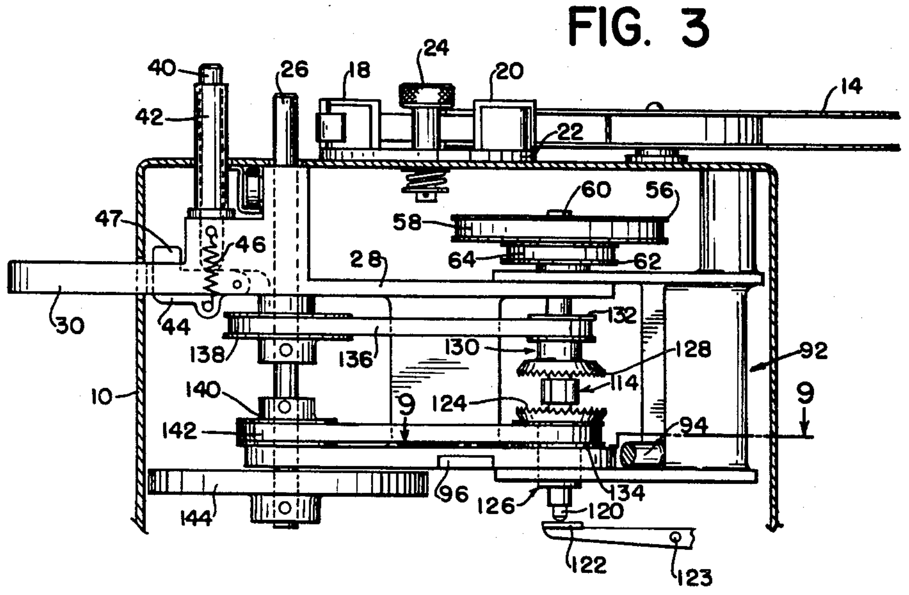
FIG. 3 is a transverse vertical section taken on the line 3—3 of FIG. 2.

Referring to the drawings in detail the invention as embodied therein and as indicated in FIGS. 1 and 2 includes a substantially rectangular casing 10 which houses the driving mechanism and reel retarding clutching mechanism for transporting a recording tape 12 between a set of reels 14 and 16 and into contact with a pre-selected one of two recording and reproducing heads 18 and 20 which are mounted on a rotatable turret 22 and which may be revolved by operating a handle or knob 24 to position the heads in the path of travel of the tape between the two reels as desired. In accordance with the invention one of the recording heads 18 and 20 is provided with two sound tracks and the other head is provided with four. Means (not shown) are provided to permit selective use of one or more of the sound tracks of each head in accordance with the positioning of the head in respect to the recording tape 12. In the position indicated in FIG. 1 the recording head 18 is located for actuation to either record or reproduce one or two soundtracks on the tape 12 depending on the electrical connections to the head.

In accordance with the invention the tape 12 is transported between the two reels 14 and 16 in either direction by means of a single upstanding driving capstan shaft 26 which may be rotated by means, to be described hereinafter, in either direction at multiple speeds. The capstan shaft 26 is mounted in a pivotal block member generally designated 28 (FIGS. 1, 4 and 9) which is provided with a handle 30 which extends outwardly through the forward face of the casing 10. The handle 30 is provided to shift the capstan 26 into operative engagement with the tape which is held in biased engagement with one of two sets of backing rollers 32 and 34 which are located on opposite sides of the turret 22. Guide rollers 36 and 38 are provided on each side of the backing rollers 32 and 34 in directions toward their associated reels 16 and 14.

In FIG. 1 the capstan is shown in a neutral position. When it is desired to shift this to a driving position a vertically reciprocable holding button 40 (FIGS. 1 and 4) is depressed to unlatch the handle 30. The button 40 is slidable within its supporting collar 42 which projects upwardly above the top of the casing 10. The button is biased into contact with a latch lever 44 by a spring 46. The latch lever 44 is provided with an upstanding portion 47 which fits into a slot 50 to lock the arm 30 in plate (FIGS. 1, 2, 3 and 4). By depressing the button 40 the latch lever 44 is lifted out of the slot 50 to permit shifting of the handle 30. When the handle 30 is shifted either to the left or right as indicated in FIG. 1 it may be moved to position the driving capstan 26 is engagement with the tape at the location of the roller 32 or at the location of the roller 34.

Figure 5:
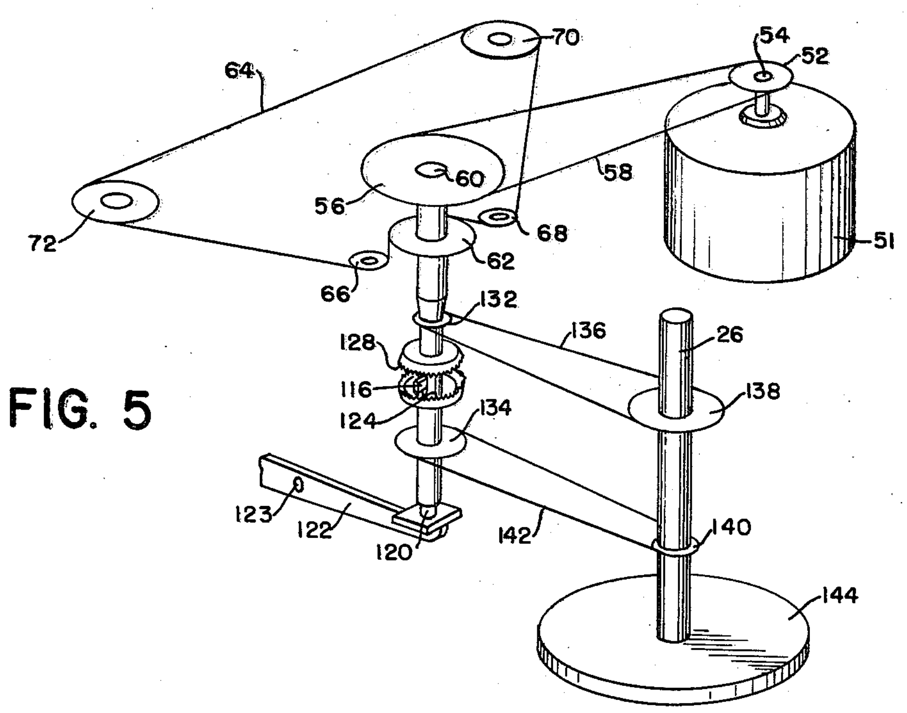
FIG. 5 is a fragmentary somewhat schematic perspective view of the capstan driving mechanism.
Figure 6:
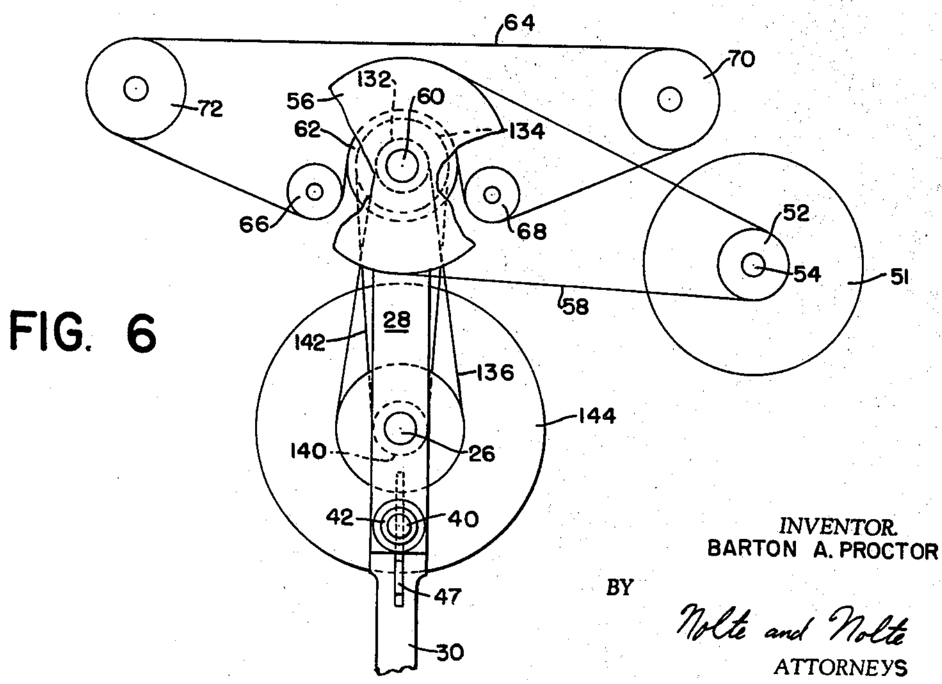
FIG. 6 is a fragmentary schematic top plan of the capstan driving mechanism.

Referring to FIGURES 5 and 6, the capstan drive is operated by a motor 51 having a pulley 52 affixed to its main shaft 54. The pulley 52 drives a pulley 56 through a belt 58. The pulley 56 is mounted on a speed clutch shaft generally designated 60.

Figure 7:
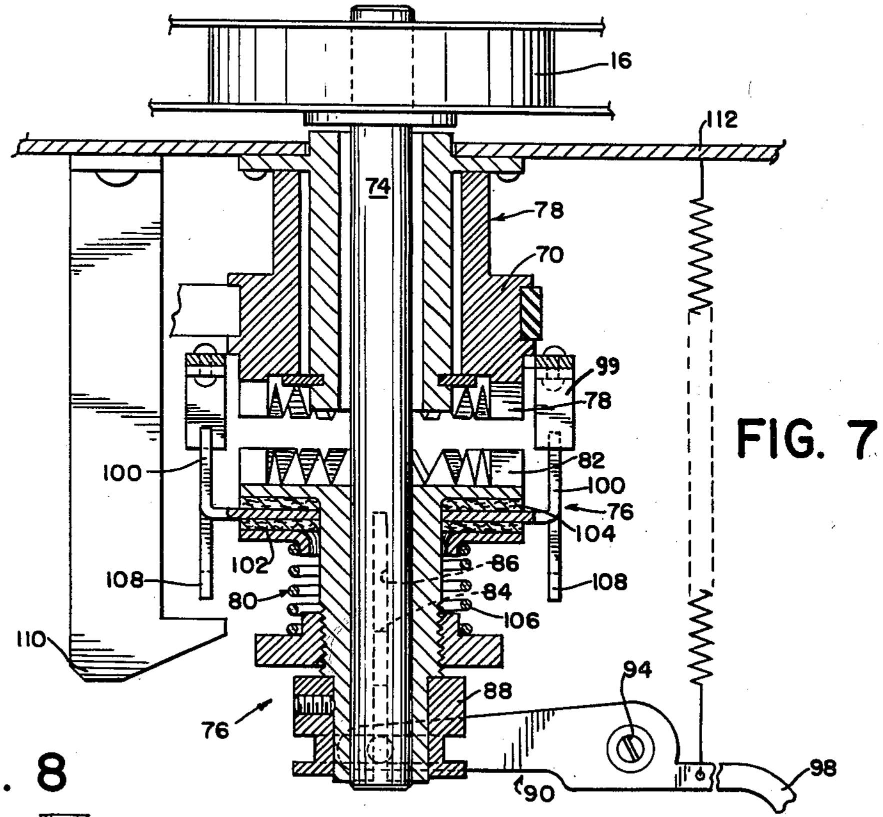
FIG. 7 is a transverse vertical section of the tape reel clutching mechanism.
Figure 8:
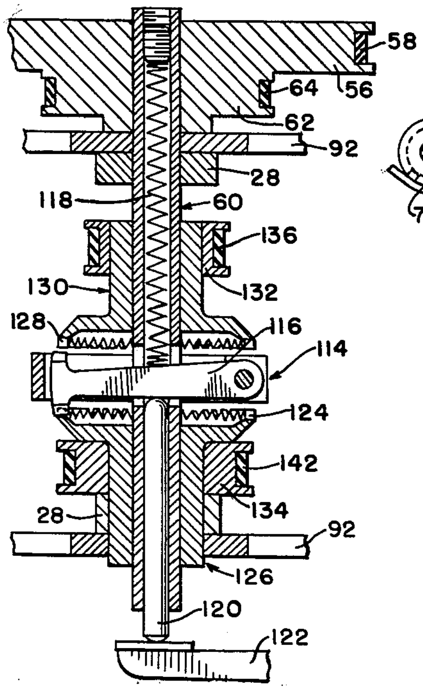
FIG. 8 is an enlarged fragmentary vertical section of the capstan speed adjustment mechanism.

Affixed to the upper portion of the speed clutch shaft is a pulley 62 which is provided with a belt 64 which extends around idler pulleys 66 and 68 and around pulley sleeve members generally designated 70 and 72 each of which rotate tape reel shafts 74, 74 in accordance with the positioning of a clutch mechanism generally designated 76 (FIG. 7). The pulley sleeve members 70 and 72 are continuously rotated by the driving motor 51 and each is provided with a lower gear face clutch plate generally designated 78 (FIG. 8).

The reel shaft 74 is rotatably supported in the casing 10 and is provided with an upper gear face clutch plate member generally designated 78 having a complementary gear face clutch plate 82 for engagement with the gear face clutch plate 78. The clutch member 80 is provided with a key 84 which slides in a keyway 86 of the shaft 74. The shaft 74 is supported in a yoke arm 88 of a lever member generally designated 90 (FIGS. 4 and 7) which is pivotally mounted at the bottom of a corner channel member generally designated 92 which is supported within the casing 10. (See FIGS. 3, 4, 7 and 9). The lever member 90 is pivoted on outstanding portion 94 which are affixed to each of the lower side ends of the corner channel member 92. The corner channel member 92 also provides a bearing support for the clutch shaft 60 about which the block member 28 is pivotable.

Figure 4:
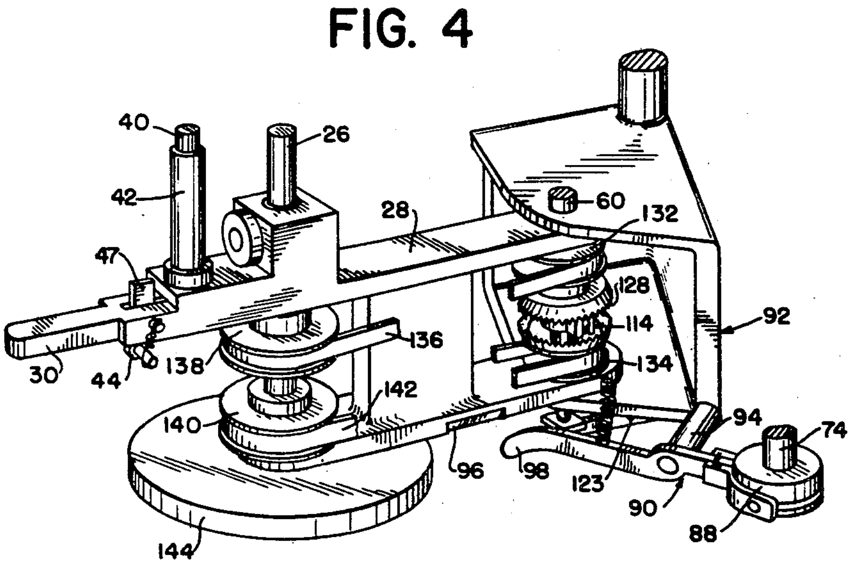
FIG. 4 is a perspective view of a portion of the capstan driving mechanism and the tape reel clutch actuator.
Figure 9:
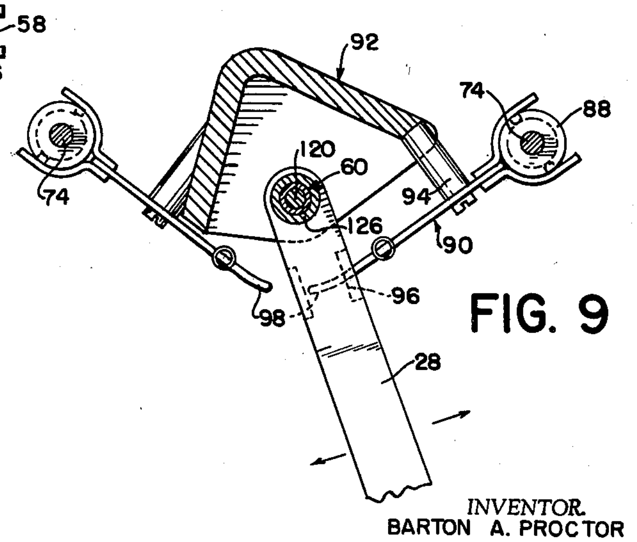
FIG. 9 is a fragmentary horizontal section taken on the line 9—9 of FIG. 3.

When the block member 28 is shifted into a driving position with the capstan in driving engagement with either the tape at the location of the roller 32 or the tape at the location of the roller 34, a lower bevelled portion 96 of the block member contacts a curved end of an arm portion 98 of the lever member 90 to bias the yoke arm 88 and the shaft 74 upwardly (see FIGS. 4, 7, and 9). In their fully upwardly biased position the gear face clutch plate 82 is moved into engagement with the gear face clutch plate 78 and driving of the tape reel on the shaft 74 is effected from the pulley sleeve member 70 through the clutch member 80 and to the shaft 74 to rotate the reel 16 and assist the capstan 26 in transporting the tape onto the reel 16.

When the block member 28 (see FIG. 9) is shifted to a neutral position the bevelled portion 96 rolls off the end of the arm 98 and permits the lowering of the yoke 88 and the shaft 74 and the downward movement of the gear face clutch plate 82 out of contact with the gear face clutch plate 78. In the position indicated in FIG. 7 downwardly extending members 99 on each side of the pulley sleeve member 70 remain in contact with upstanding arms 100 which are held by friction plates 102 and 104 biased together by a spring 106 on the clutch member 80. In this position there is a driving engagement from the pulley sleeve member 70 to the clutch member 82 but slippage may occur depending on the force of the spring 106 against the clutch plates 102 and 104. This mechanism also retards independent rotation of the reel and overdrive of the tape.

The clutch member 80 shifts downwardly an additional amount when the arm 98 is completely off the block member 28 as indicated in FIG. 4. In this position downwardly extending arms 108 move into contact with a stationary member 110 affixed to the top 112 of the casing 10. In this portion rotation of the reel shaft 74 is retarded by the action of the member 108 abutting against a stationary member 110. This position is taken when the reel 16 is being unwound and its prevents the overtravel of the reel during rapid speed windings.

Referring to FIGS. 3, 4, 5 and 8, the speed clutch shaft 60 is provided with a driving sleeve member generally designated 114 which carries a pivotal driving arm 116 which is pivoted at one end to the sleeve 114 and is biased downwardly by a spring 118 into contact with a rod member 120 which is supported on a speed shifting arm 122. The speed shift arm 122 is pivotally mounted as at 123 and is provided with a handle extension (not shown) which extends out of the casing 10 and may be moved to raise and lower the pin 120 and shift the position of the driving arm 116 either from a position in engagement with the teeth 124 of a lower low-speed pulley sleeve member generally designated 126 or teeth 128 of the upper high-speed pulley sleeve member 130. Thus, depending on the position of the member 116 the speed clutch shaft 60 with either rotate the upper high-speed pulley sleeve member 130 having a small diameter pulley 132 thereon, or the lower low-speed pulley sleeve member 126 having a large diameter pulley 134 thereon. The small diameter pulley 132 drives through a belt 136 a larger diameter pulley 138 affixed to the capstan shaft 26 and effects rotation of the capstan shaft 26 at low speed. With the arm 116 in the position indicated in FIG. 8 the pulley 134 will be rotated to drive a small diameter pulley 140 on the capstan shaft 26 through a belt 142. This will effect rotation of the capstan 26 at high speed. The capstan shaft 26 is provided with a flywheel 144 affixed to the lower end thereof.

While a specific embodiment of the invention has been shown and described in detail to illustrate the application of the invention principles, it will be understood that the invention may be embodied otherwise without departing from such principles.

What is claimed is:

1. A recording medium drive comprising first and second spaced reel members, a recording tape extending between and being windable upon each of said reel members, recording tape driving means between said reels including an upstanding capstan shaft, means to selectively rotate said capstan shaft in a clockwise direction and a counterclockwise direction, a first idler roller on one side of said capstan shaft adjacent said first reel, a second idler roller on the other side of said capstan shaft adjacent said second winding reel, said recording medium being trained to run around said first and second idler rollers, and means to shift said capstan shaft into driving association with said tape at said first idler roller for winding said tape on said first reel upon rotation of said capstan shaft in one direction and for shifting said capstan into driving association with said tape at said second roller for winding said tape on said second reel upon rotation of said capstan shaft in the opposite direction.

2. A recording medium drive according to claim 1 including means for adjusting the speed of said capstan shaft.

3. A recording medium drive according to claim 1 including means connected to said driving means for selectively driving said first and second reels.

4. A recording medium drive according to claim 3, wherein each of said reels is provided with a driving shaft, a pulley freely rotatable on each of said shafts, means connecting each of said pulleys with said driving means for rotating said pulleys, and clutch means connecting each of said pulleys with associated reel-driving shaft for selectively driving said reel driving shafts.

5. A recording medium drive according to claim 4, wherein said clutch means includes a clutch control member, and wherein said means to shift said capstan shaft includes a portion displaceable by said means to shift said capstan shaft to engage the clutch of an associated reel upon shifting of the capstan shaft into a driving engagement with said reel.

6. A drive for transporting recording medium between a pair of spaced rotatable reels, comprising, magnetic head means between said reels, backing roller means adjacent each of said reels between a reel and said magnetic head means, a rotatable capstan, means for rotating said capstan, and movable means supporting said rotatable capstan and movable to selectively position said capstan at a location in engagement with one of said backing roller means and to a location in engagement with the other of said backing roller means, and to permit driving engagement of said recording medium at the location of the respective backing rollers by contact therewith by said capstan.

7. A drive for transporting recording medium according to claim 6, wherein said movable means for supporting said capstan includes a block member pivotally supported at one end.

8. A drive for transporting recording medium according to claim 6, wherein said means for rotating said capstan includes a drive shaft and pulley means connecting said drive shaft and said capstan.

9. A drive for transporting recording medium according to claim 8, wherein said movable capstan supporting means includes a block member supporting said capstan at one end and pivotally mounted at the location of said drive shaft at its opposite end.

10. A drive for transporting recording medium according to claim 8, wherein said pulley means connecting said drive shaft and said capstan includes a high-speed pulley set and a low-speed pulley set, and clutch means for driving through a selective one of said high-speed and said low-speed pulley sets.

11. A drive for transporting recording medium according to claim 8, wherein said means for rotating said capstan includes means for driving each of said reels, and friction retarding means selectively engageable with each of said reels, and wherein said means for driving said reels includes means for engaging said friction retarding means of one reel when the capstan is in driving engagement with the recording medium adjacent the opposite reel.

12. A drive according to claim 10, wherein said clutch means includes a driving member attached for rotation to said drive shaft, a clutch member pivotally attached to said driving member, each of said high-speed and low-speed pulley sets including a toothed peripheral edge surface and a pulley portion, one of said pulley sets being floatingly mounted on said drive shaft on one side of said clutch member, the other one of said pulley sets being mounted coaxially with and independently from the one pulley set on the other side of said clutch member, the toothed peripheral edge surfaces of said pulley sets facing each other, spring means for biasing said clutch member into driving engagement with the toothed edge of one of said pulley sets, and means for selectively pushing said clutch member against the bias of said spring means into driving engagement with the toothed edge of the other one of said pulley sets.

References Cited in the file of this patent

UNITED STATES PATENTS

| | | |
|---|---|---|
| 2,005,738 | Foster | June 26, 1935 |
| 2,069,595 | Thomas | Feb. 2, 1937 |
| 2,384,044 | Poorman | Sept. 4, 1945 |
| 2,624,214 | Arensberg | Jan. 6, 1953 |
| 2,732,144 | Jones | Jan. 24, 1956 |
| 2,793,039 | Hironimus | May 21, 1957 |
| 2,913,537 | Newman | Nov. 17, 1959 |
| 2,919,866 | Minott | Jan. 6, 1960 |
| 2,941,737 | Jones | June 21, 1960 |
| 2,958,477 | James | Nov. 1, 1960 |
| 2,964,594 | Beckner | Dec. 13, 1960 |
| 2,974,537 | Wheeler | Mar. 14, 1961 |

FOREIGN PATENTS

| | | |
|---|---|---|
| 756,972 | Great Britain | Sept. 12, 1956 |